(12) United States Patent
Kim et al.

(10) Patent No.: US 9,001,302 B2
(45) Date of Patent: Apr. 7, 2015

(54) LIQUID CRYSTAL DISPLAY AND MANUFACTURING METHOD THEREOF

(75) Inventors: Gwan-Soo Kim, Asan-si (KR); Chul Huh, Yongin-si (KR); Dong-Uk Kang, Suwon-si (KR)

(73) Assignee: Samsung Display Co., Ltd. (KR)

( * ) Notice: Subject to any disclaimer, the term of this patent is extended or adjusted under 35 U.S.C. 154(b) by 166 days.

(21) Appl. No.: 13/525,727

(22) Filed: Jun. 18, 2012

(65) Prior Publication Data

US 2013/0077031 A1    Mar. 28, 2013

(30) Foreign Application Priority Data

Sep. 22, 2011 (KR) .................. 10-2011-0095746

(51) Int. Cl.
*G02F 1/1339* (2006.01)
*G02F 1/1362* (2006.01)

(52) U.S. Cl.
CPC ...... *G02F 1/13394* (2013.01); *G02F 1/136209* (2013.01); *G02F 2001/136222* (2013.01)

(58) Field of Classification Search
USPC ........................................................ 349/156
See application file for complete search history.

(56) References Cited

U.S. PATENT DOCUMENTS

| 7,704,646 | B2 | 4/2010 | Park et al. | |
| 7,750,999 | B2 * | 7/2010 | Park | ............................ 349/110 |
| 2002/0039692 | A1 | 4/2002 | Tanaka | |
| 2006/0051974 | A1 | 3/2006 | French et al. | |
| 2013/0100386 | A1 | 4/2013 | Kim et al. | |

FOREIGN PATENT DOCUMENTS

| JP | 2000075305 A | 3/2000 |
| JP | 2001091727 A | 4/2001 |
| JP | 2008281919 A | 11/2008 |
| JP | 2010014870 A | 1/2010 |
| KR | 1020070039628 A | 4/2007 |
| KR | 1020070069829 A | 7/2007 |
| KR | 1020070071985 A | 7/2007 |
| KR | 1020080034545 A | 4/2008 |
| KR | 1020080061192 A | 7/2008 |
| KR | 1020080082164 A | 9/2008 |

\* cited by examiner

*Primary Examiner* — James Dudek
(74) *Attorney, Agent, or Firm* — Cantor Colburn LLP

(57) ABSTRACT

A manufacturing method of a liquid crystal display includes: forming a thin film transistor on a first substrate; forming a color filter on the thin film transistor; forming a pixel electrode on the color filter; and forming a light blocking member including a column spacer protruded from the light blocking member on the color filter. The forming the light blocking member uses a mask including a first region, a second region, and a third region. The first region passes light generated from a light exposer, the second region includes a blocking filter layer which selectively passes the light generated from the light exposer, and the third region blocks the light generated from the light exposer.

11 Claims, 8 Drawing Sheets

LIQUID CRYSTAL DISPLAY AND MANUFACTURING METHOD THEREOF

This application claims priority to Korean Patent Application No. 10-2011-0095746 filed on Sep. 22, 2011, and all the benefits accruing therefrom under 35 U.S.C. §119, the entire contents of which are incorporated herein by reference.

BACKGROUND OF THE INVENTION (a) Field of the Invention

The invention relates to a liquid crystal display and a manufacturing method thereof.

(b) Description of the Related Art

Among display panels, a liquid crystal display ("LCD") is one of flat panel displays that is being widely used, and includes two display panels in which field generating electrodes such as a pixel electrode and a common electrode, etc., are formed, and a liquid crystal ("LC") layer disposed therebetween. The LCD displays images by applying voltages to the field-generating electrodes to generate an electric field in the LC layer that determines the orientations of LC molecules therein to adjust polarization of incident light.

Among the liquid crystal displays, the liquid crystal display that is mostly used is a structure in which field generating electrodes are provided in two display panels. Among them, the mainstream structure is a structure in which a plurality of thin film transistors and pixel electrodes are arranged in a matrix form in the display panel (hereinafter referred to as "thin film transistor array panel"), and color filters of red, green, and blue are formed and a common electrode covers the entire surface thereof in the other display panel (hereinafter referred to as "common electrode panel").

However, when the pixel electrodes and the color filters are formed on the different display panels, it is difficult to correctly align the pixel electrodes and the color filters such that an alignment error may be generated. To solve this problem, a color filter on array ("COA") structure in which the pixel electrodes and the color filters are formed on the same display panel is provided.

Also, when considering a combination margin when combining the thin film transistor array panel and the common electrode panel, a light blocking member such as a black matrix is formed with a larger size than a predetermined size. However, the aperture ratio may be decreased by the size of the black matrix such that the black matrix may be formed in the thin film transistor array panel.

An interval of the liquid crystal layer between two display panels is referred to as a cell gap, and the cell gap influences general operation characteristics of the liquid crystal display such as response speed, contrast ratio, viewing angle, and luminance uniformity. If the cell gap is not uniform, a uniform image is not displayed on the whole screen such that the display quality is deteriorated. Accordingly, to maintain the uniform cell gap throughout the whole region of the substrate, a plurality of spacers is formed on one of the two panels.

Particularly, the spacers and the light blocking member may be simultaneously formed to simplify the process. However, if the spacers (column spacers) and the light blocking member are simultaneously formed, a reflow is generated in a post-hardening process among the manufacturing process.

As described above, if the reflow is generated in the spacer manufacturing process, a taper of the spacer is deteriorated such that a process margin becomes poor, and a compression characteristic of the spacer to maintain the cell gap is deteriorated by an external impact.

BRIEF SUMMARY OF THE INVENTION

Accordingly, the invention provides a liquid crystal display in which a reflow in a spacer forming process is prevented and a process margin is improved, and a manufacturing method thereof.

A manufacturing method of a liquid crystal display according to an exemplary embodiment of the invention includes: forming a thin film transistor on a first substrate; forming a color filter on the thin film transistor; forming a pixel electrode on the color filter; and forming a light blocking member including a column spacer protruded from an upper surface of the light blocking member on the color filter. The forming the light blocking member uses a mask including a first region, a second region, and a third region. The first region passes light generated from a light exposer, the second region includes a blocking filter layer which selectively passes the light generated from the light exposer, and the third region blocks the light generated from the light exposer.

The forming of the light blocking member including the column spacer may include coating a photoresist on the color filter, exposing the photoresist by using the mask, and developing the photoresist to form the column spacer at a position corresponding to the first region and the light blocking member at a position corresponding to the second region.

The light passing through the first region and the second region may expose the photoresist with the same energy, in the exposing of the photoresist.

The photoresist may include a binder, a monomer, an initiator, a coloring agent, and a solvent. The initiator may include a first initiator portion of a first absorption wavelength band and a second initiator portion of a second absorption wavelength band different from the first absorption wavelength band. The coloring agent may be formed of a black-based material.

The coloring agent may include at least one selected from the group consisting of an organic pigment and an inorganic pigment.

The first or second initiator portion may absorb light of the wavelength band passing through the blocking filter layer.

The method may further include forming an organic layer between the thin film transistor and the pixel electrode.

The method may further include forming a second substrate facing the first substrate, and forming a liquid crystal layer including a liquid crystal and an alignment polymer interposed between the first substrate and the second substrate. The alignment polymer may be formed by light-irradiating the liquid crystal and an alignment aid.

The pixel electrode may include a plurality of minute slits.

A liquid crystal display according to another exemplary embodiment of the invention includes: a first substrate; and a second substrate facing the first substrate. The first substrate includes a thin film transistor disposed on the first substrate; a color filter disposed on the thin film transistor; a pixel electrode disposed on the color filter; and a light blocking member disposed on the color filter. The light blocking member includes a column spacer protruded from an upper surface of the light blocking member and maintains an interval between the first substrate and the second substrate.

The light blocking member and the column spacer may include the same material.

The light blocking member and the column spacer may be integrally formed, such that the light blocking member is a single, unitary, indivisible member.

The light blocking member and the column spacer may include a black-based material.

The light blocking member and the column spacer may include a material including at least one selected from the group consisting of an organic pigment and an inorganic pigment.

The light blocking member including the column spacer which protrudes from the upper surface of the light blocking member as the single, unitary, indivisible member of the first substrate, may be formed by exposing a negative photoresist using a single mask.

The liquid crystal display may further include an organic layer disposed between the thin film transistor and the pixel electrode.

The liquid crystal display may further include a liquid crystal layer interposed between the first substrate and the second substrate and including a liquid crystal and an alignment polymer. The alignment polymer in the liquid crystal layer is formed by light-irradiating an alignment aid in the presence of the liquid crystal.

The pixel electrode may include a plurality of minute slits.

According to an exemplary embodiment of the invention, the light blocking member and the column spacer are simultaneously formed such that the reflow may be prevented, and the process margin may be improved while simplifying the manufacturing process.

BRIEF DESCRIPTION OF THE DRAWINGS

The above and other features of this disclosure will become more apparent by describing in further detail exemplary embodiments thereof with reference to the accompanying drawings, in which.

DETAILED DESCRIPTION OF THE INVENTION

Figure 1:
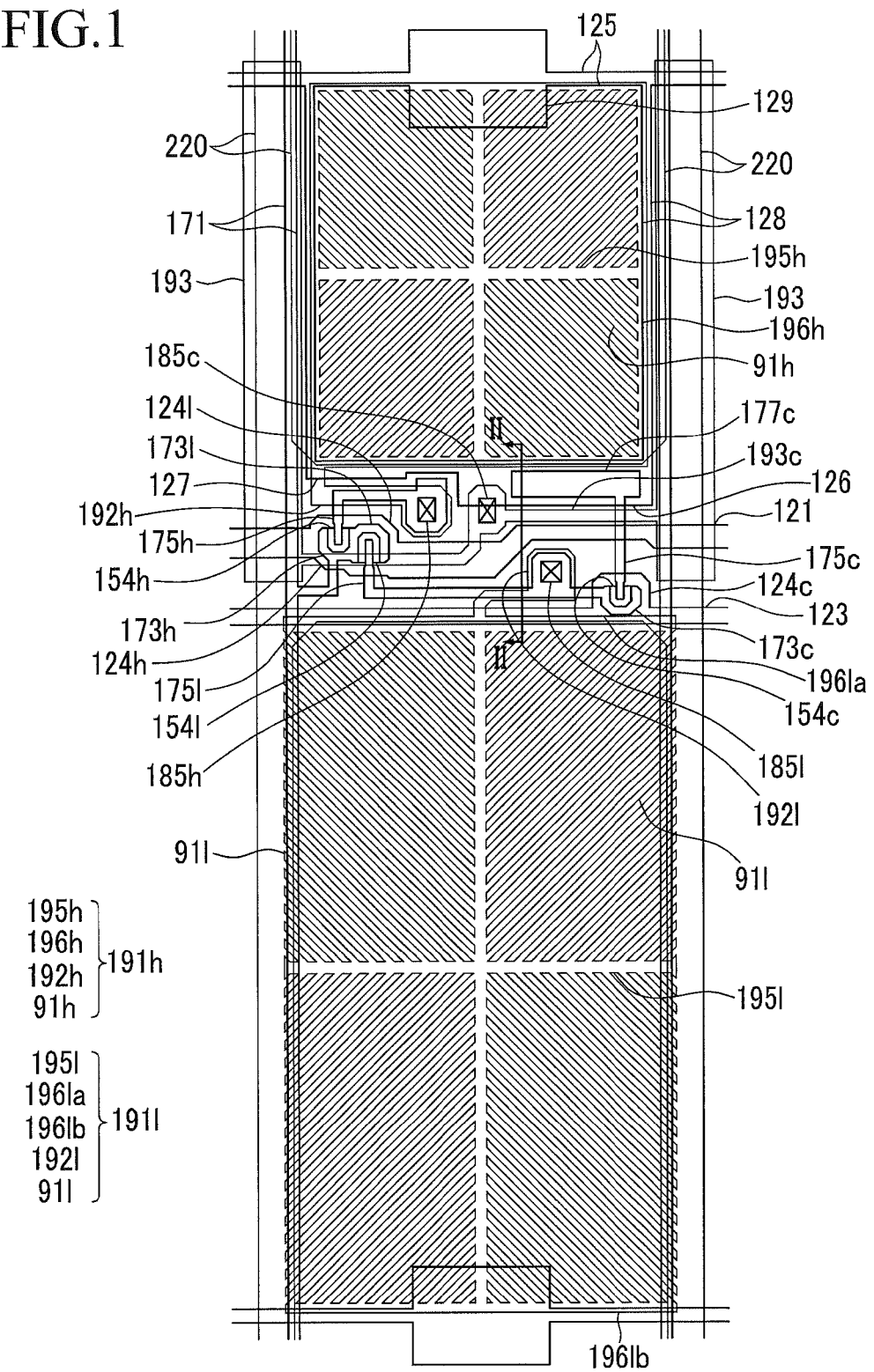
FIG. 1 is a plan view of an exemplary embodiment of a liquid crystal display according to the invention.

Exemplary embodiments of the invention will be described in detail with reference to the accompanying drawings. However, the invention is not limited to exemplary embodiments described herein, but may be embodied in other forms. Rather, exemplary embodiments described herein are provided to thoroughly and completely understand the disclosed contents and to sufficiently transfer the ideas of the invention to a person of ordinary skill in the art.

In the drawings, the thickness of layers and regions is exaggerated for clarity. It is to be noted that when a layer is referred to as being "on" another layer or substrate, it can be directly formed on another layer or substrate or can be formed on another layer or substrate through a third layer interposed therebetween. In contrast, when an element is referred to as being "directly on" another element or layer, there are no intervening elements or layers present. As used herein, "connected" includes physically and/or electrically connected. Like constituent elements are denoted by like reference numerals denotes throughout the specification.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

Hereinafter, the invention will be described in detail with reference to the accompanying drawings.

"Alkyl" means a straight or branched chain, saturated, monovalent hydrocarbon group (e.g., methyl or hexyl).

Figure 2:
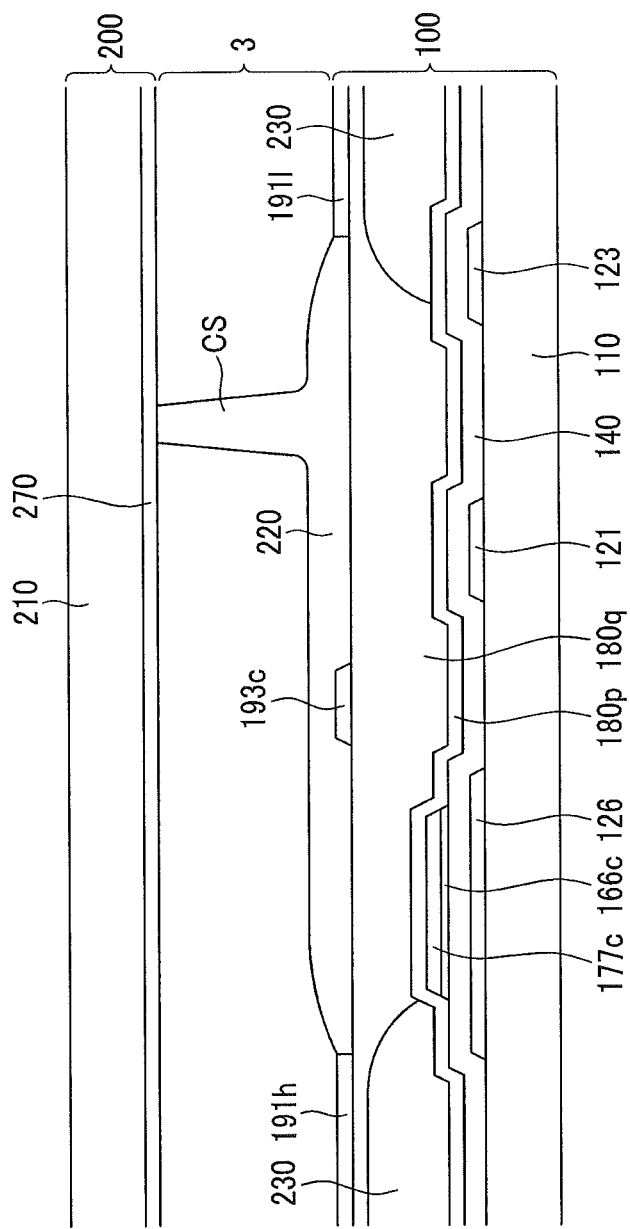
FIG. 2 is a cross-sectional view taken along line II-II of FIG. 1.

FIG. 1 is a plan view of an exemplary embodiment of a liquid crystal display according to the invention. FIG. 2 is a cross-sectional view taken along line II-II of FIG. 1.

An exemplary embodiment of a liquid crystal display according to the invention includes a lower panel 100 and an upper panel 200 facing each other, and a liquid crystal layer 3 interposed between the two display panels 100 and 200. Polarizers (not shown) may be provided on an outer surface of the display panels 100 and/or 200.

First, the lower panel 100 will be described.

A plurality of gate conductors including a plurality of gate lines 121, a plurality of step-down gate lines 123, and a plurality of storage electrode lines 125 are on an insulation substrate 110.

The gate lines 121 and the step-down gate lines 123 transfer gate signals and mainly extend in a transverse direction. Each gate line 121 includes a first gate electrode 124h and a second gate electrode 124l protruding downward and upward in the plan view, respectively, and each step-down gate line 123 includes a third gate electrode 124c protruding upward. The first gate electrode 124h and the second gate electrode 124l are connected to each other, thereby forming one protrusion of the single, unitary, indivisible gate line 121.

The storage electrode lines 125 are mainly extended in the transverse direction and transfer a predetermined voltage such as a common voltage Vcom. The storage electrode line 125 includes a storage electrode 129 protruding upward and downward, a pair of longitudinal portions 128 extending almost perpendicularly to the gate line 121 and downward, and a transverse portion 127 connecting distal ends of the pair of longitudinal portions 128 to each other. The transverse portion 127 includes a storage expansion 126 extended downward.

A gate insulating layer 140 covering (e.g., overlapping) the gate conductors 121, 123, and 125 is on the gate conductors 121, 123, and 125.

A plurality of semiconductor stripes including hydrogenated amorphous silicon (a-Si), polysilicon, or so on is on the gate insulating layer 140. The semiconductor stripes are mainly extended in the vertical (e.g., longitudinal) direction and include branches extending toward the gate electrodes 124h, 124l, and 124c. That is, each semiconductor stripe includes first and second semiconductors 154h and 154l extending toward the first and second gate electrodes 124h and 124l and disposed corresponding to the first and second gate electrodes 124h and 124l. Also, each semiconductor stripe further includes a third semiconductor 154c extending from the second semiconductor 154l and disposed corresponding to the third gate electrode 124c. The term "corresponding" maybe used to indicate substantially similar in dimension, shape and/or positional placement such as overlapping, with respect to another feature.

A plurality of ohmic contact stripes are formed on the semiconductor stripes while exposing a portion of the semiconductor stripe at a position corresponding to the gate electrodes 124h, 124l, and 124c. That is, first ohmic contacts are on the first semiconductor 154h and the semiconductor stripe is exposed between the first ohmic contacts. In this way, second ohmic contacts and the third ohmic contact are respectively on the second semiconductor 154l and the third semiconductor 154c, and the semiconductor stripe is partially exposed therebetween.

A data conductor including a plurality of data lines 171, a plurality of first drain electrodes 175h, a plurality of second drain electrodes 175l, and a plurality of third drain electrodes 175c are on the ohmic contacts.

The data lines 171 transmit data signals and mainly extend in the longitudinal direction thereby intersecting the gate lines 121 and the step-down gate lines 123. The data line 171 is connected to a first source electrode 173h having a 'U' shape and a second source electrode 173l having an inverted "U" shape, and the first source electrode 173h and the second source electrode 173l extend toward the first gate electrode 124h and the second gate electrode 124l. As shown, the first source electrode 173h and the second source electrode 173l are electrically connected to each other while sharing one side edge.

The first drain electrode 175h has a first end portion having a wide area and a second end portion having a linear portion of a curved bar shape. The linear end portion is enclosed by the first source electrode 173h, and the wide end has a relatively wide width thereby providing an area that is capable of contacting an upper layer within the liquid crystal display. The width is taken perpendicular to a longitudinal direction of the of the first end portion. The second drain electrode 175l includes a linear first end portion of a curved bar shape, a second end portion having a "U" shape, and a wide portion having a relative wide width between the first and second opposing ends. The linear first end portion is enclosed by the second source electrode 173l, and the second end portion of the "U" shape forms a third source electrode 173c. Also, the wide portion provides an area that is capable of contacting an upper layer of the liquid crystal display. Further, the third drain electrode 175c has a linear first end portion of a straight bar shape and a second end portion 177c having a relatively wide area. The linear end portion is enclosed by the third source electrode 175c, and the wide end portion 177c overlaps the storage expansion 126 thereby forming a step-down capacitor Cstd.

The first to third gate electrode 124h, 124l, and 124c, the first to third source electrode 173h, 173l, and 173c and the first to third drain electrode 175h, 175l, and 175c respectively form first to third thin film transistors ("TFT") Qh, Ql, and Qc (see FIG. 5) along with the first to the third semiconductors 154h, 154l, and 154c. The channels of the thin film transistors Qh, Ql, and Qc are respectively on the semiconductors 154h, 154l, and 154c between the source electrodes 173h, 173l, and 173c and the drain electrodes 175h, 175l, and 175c. Each channel may be in an exposed region of the semiconductors 154h, 154l, and 154c that is not covered by the ohmic contacts.

Also, the semiconductor stripes including the semiconductors 154h, 154l, and 154c except for the channel region between the source electrodes 173h, 173l, and 173c, and the drain electrodes 175h, 175l, and 175c, have substantially the same planar shape as the data conductors 171, 175h, 175l, and 175c and the underlying ohmic contacts. The semiconductor stripes including the semiconductors 154h, 154l, and 154c have a portion that is exposed without being covered by the data conductors 171, 175h, 175l, and 175c, and a portion between the source electrodes 173h, 173l, and 173c and the drain electrodes 175h, 175l, and 175c.

A lower passivation layer 180p including an inorganic insulator such as silicon nitride or silicon oxide is on the data conductors 171, 175h, 175l, 175c and the exposed semiconductors 154h, 154l, and 154c.

A color filter 230 is disposed directly on the lower passivation layer 180p. The color filter 230 is in almost all regions except for the position where the first thin film transistor Qh, the second thin film transistor Ql, and the third thin film transistor Qc are disposed. Each color filter 230 may display one of primary colors such as three primary colors of red, green, and blue ("RGB"). Also, each color filter 230 may mainly extended in the longitudinal direction between neighboring or adjacent data lines 171, and color filters 230 of the same color may not neighbor each other.

An upper passivation layer 180q including an organic material is directly on the lower passivation layer 180p and the color filter 230.

The lower passivation layer 180p and the upper passivation layer 180q have first contact holes 185h extending through thicknesses thereof and exposing the wide end portion of the first drain electrode 175h, and second contact holes 185l extending through thicknesses thereof and exposing the wide end portion of the second drain electrode 175l. Also, the lower passivation layer 180p and the upper passivation layer 180q have a third contact hole 185c extending through thicknesses thereof and exposing a region that is the upper portion of the storage expansion 126, and does not overlap the wide end portion 177c of the third drain electrode 175c.

A pixel electrode including a first sub-pixel electrode 191h and a second sub-pixel electrode 191l, and a shielding electrode 193 are directly on the upper passivation layer 180q. The shielding electrode 193 includes longitudinal portions and a transverse portion 193c connecting the longitudinal portions to each other.

The first and second sub-pixel electrodes 191h and 191l neighbor each other in the longitudinal direction. A height in the longitudinal direction of the second sub-pixel electrode 191l may be about one to three times the height in the longitudinal direction of the first sub-pixel electrode 191h.

An overall or entire planar shape of the first sub-pixel electrode 191h is a quadrangle, and includes a cross stem 195h including a transverse stem and a longitudinal stem, an outer stem 196h around a periphery, and a protrusion 192h protruded downward from a lower portion of the outer stem 196h and electrically connected to the first drain electrode 175h through the first contact hole 185h. Also, the first sub-pixel electrode 191h further includes a first minute branch electrode 91h of which one end is connected to the cross stem 195h and an opposing other end is connected to the outer stem 196h, and extended in the oblique direction.

An overall or entire planar shape of the second sub-pixel electrode 191l is a quadrangle, and includes a cross stem 195l including a transverse stem and a longitudinal stem, an upper transverse portion 196la, a lower transverse portion 196lb, and a protrusion 192l protruded upward from an upper portion of the upper transverse portion 196la and electrically connected to the second drain electrode 175l through the second contact hole 185l. Also, the second sub-pixel electrode 191l further includes a second minute branch electrode 91l of which one end opposite to the distal end is connected to the cross stem 195l and extended in an oblique direction with respect to the cross stem 195l.

The first sub-pixel electrode 191h and the second sub-pixel electrode 191l are respectively divided into four sub-regions by the cross stems 195h and 195l. Each sub-region includes a plurality of minute branch electrodes 91h and 91l obliquely extending away from the cross stems 195h and 195l. The minute branch electrodes 91h and 91l of each sub-region form a minute slit pattern, and the minute branch electrodes 91h and 91l may form an angle of about 45 or 135 degrees with respect to the gate line 121. The directions of minute branch electrodes 91h and 91l of neighboring sub-regions may cross each other.

The protrusion 192h of the first sub-pixel electrode 191h receives the data voltage from the first drain electrode 175h through the first contact hole 185h, and the protrusion 192l of the second sub-pixel electrode 191l receives the data voltage from the second drain electrode 175l through the second contact hole 185l. Here, the data voltage applied to the second sub-pixel electrode 191l may be less than the data voltage applied to the first sub-pixel electrode 191h.

The transverse portion 193c of the shielding electrode 193 is electrically connected to the storage expansion 126 through the third contact hole 185c, thereby receiving a predetermined voltage such as a common voltage Vcom applied to the storage expansion 126. The shielding electrode 193 covers a portion of the data line 171 thereby electrically blocking the data line 171, and accordingly signal delay caused by coupling may be reduced or effectively prevented. The shielding electrode 193 is connected to the storage expansion 126 such that it may have the function of increasing the storage capacitance of a pixel.

A light blocking member 220 is on a region that the color filter 230 does not occupy and a region overlapping a portion of the color filter 230. The light blocking member 220 is disposed directly on the upper insulating layer 180q, and overlaps the shielding electrode 193 thereby preventing light leakage. The light blocking member 220 includes a portion covering the region where the first thin film transistor Qh, the second thin film transistor Ql, and the third thin film transistor Qc are disposed, and a portion overlapping the data line 171.

The light blocking member 220 includes a column spacer CS protruded from an upper surface thereof and disposed in the liquid crystal layer 3. The column spacer CS has substantially the same thickness as the cell gap of the liquid crystal layer 3, thereby functioning to maintain the interval between the lower panel 100 and the upper panel 200. The column spacer CS includes the same material as the light blocking member 220 and is integrally formed with the light blocking member 220, such that the light blocking member is a single, unitary and indivisible member.

In one exemplary embodiment, the light blocking member 220 and the column spacer CS include a black-based material, and the black-based material may include at least one of carbon black, an organic pigment, an inorganic pigment, and an RGB mixture pigment.

An alignment layer (not shown) may be on the first and second sub-pixel electrodes 191h and 191l and the light blocking member 220.

The first and second sub-pixel electrodes 191h and 191l applied with the data voltage form an electric field along with a common electrode 270 of the upper panel 200 such that the electric field determines the direction of liquid crystal molecules 310 (see FIGS. 3 and 4) in the liquid crystal layer 3 between two electrodes 191 and 270, respectively. The change degree of the polarization of the light that is incident to the liquid crystal layer 3 is changed according to the inclination degree of the liquid crystal molecules 310, and this change of polarization appears as a change of transmittance by the polarizer, thereby displaying images of the liquid crystal display.

The exemplary embodiment of the first and second sub-pixel electrodes 191h and 191l of the invention include four sub-regions having different length directions of the minute slits 91h and 91l such that the inclined directions of the liquid crystal molecules 310 are all four directions. Therefore, the viewing angle of the liquid crystal display is widened by varying the inclined directions of the liquid crystal molecules 310.

The first sub-pixel electrode 191h and the common electrode 270 form a first liquid crystal capacitor Clch along with the liquid crystal layer 3 interposed therebetween, and the second sub-pixel electrode 191l and common electrode 270 form a second liquid crystal capacitor Clcl along with the liquid crystal layer 3 interposed therebetween, thereby maintaining the voltage after the first and second thin film transistors Qh and Ql are turned off.

The first and second sub-pixel electrodes 191h and 191l overlap the storage electrode line 125 as well as the storage electrode 129 thereby forming first and second storage capacitors Csth and Cstl, and the first and second storage capacitors Csth and Cstl enhance the voltage storage capacity of the first and second liquid crystal capacitors Clch and Clcl.

In an exemplary embodiment of the invention, the voltage of the first sub-pixel electrode 191h and the second sub-pixel electrode 191l may be changed, as described above, and if the voltages of the first and second sub-pixel electrodes 191h and 191l are different, the voltages applied to the first and second liquid crystal capacitors Clch and Clcl are different such that the luminance thereof are also different. Accordingly, the voltages of the first and second liquid crystal capacitors Clch and Clcl are appropriately controlled, thereby improving lateral visibility.

The operation by which the voltages of the first sub-pixel electrode 191h and the second sub-pixel electrode 191l are changed will be described later.

Next, the upper panel 200 will be described.

The common electrode 270 is on a whole surface of a transparent insulation substrate 210 in the upper panel 200. The common electrode 270 may include a transparent conductor such as indium tin oxide ("ITO") and indium zinc oxide ("IZO"). An alignment layer (not shown) may be on the common electrode 270, and may be a vertical alignment layer.

Polarizers (not shown) may be provided on the outer surfaces of the lower panel 100 and the upper panel 200.

As described above, the exemplary embodiment of the upper panel 200 according to the invention has a simple structure in that only the common electrode 270 is on the insulation substrate 210, such that the manufacturing process of the liquid crystal display may be simplified and misalignment with the lower panel 100 may be reduced.

Liquid crystal molecules 310 between the lower and upper display panels 100 and 200 have negative dielectric anisotropy, and may be oriented such that the major axes thereof are almost perpendicular to the surfaces of the two display panels 100 and 200 when no electric field is applied.

In an exemplary embodiment, the liquid crystal layer 3 includes an alignment polymer formed by light-irradiating a plurality of liquid crystals and an alignment aid. Here, the energy for light-irradiating the liquid crystal and the alignment aid 50 (see FIGS. 3 and 4) may be about 30 joules per square centimeter ($J/cm^2$) to about 100 $J/cm^2$.

If voltages are applied to the pixel electrode 191 and the common electrode 270, the liquid crystal molecules 310 respond to the electric field generated therebetween such that the long axes thereof tend to be perpendicular to the electric field direction. The change degree of polarization of the light that is incident to the liquid crystal layer 3 is changed according to the inclination degree of the liquid crystal molecules 310, and this change of polarization appears as a change of transmittance by the polarizer, thereby displaying images of the liquid crystal display.

An alignment polymer formed by the polymerization of the alignment aid 50 has a function of controlling pre-tilt as an initial alignment direction of the liquid crystal. The alignment aid 50 may be a general reactive mesogen.

The alignment aid 50 has a similar shape to the liquid crystal molecules, and includes a core group defining a core axis and a terminal group connected thereto.

The alignment aid 50 may comprise the mesogen as the core group, which is substituted with a photo-polymerizable group as the terminal group.

The mesogen includes a structure in which two or more aromatic or aliphatic rings are connected to each other, and for example may include at least one group selected from a naphthalene group represented by Formula A, a biphenyl group represented by Formula B, and a bisphenol A group represented by Formula C.

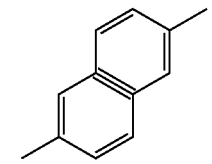

Formula A

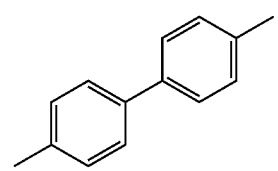

Formula B

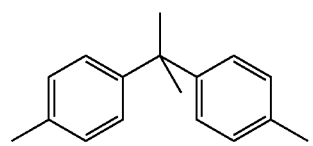

Formula C

A photo-polymerizable group is a functional group that is able to be polymerized by light, but is not limited thereto, and for example may include at least one selected from an acrylate group represented by Formula F and a methacrylate group represented by Formula G.

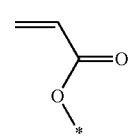

Formula F

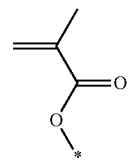

Formula G

Also, the alignment aid 50 may further include an alkyl group having 3 to 12 carbon atoms disposed between the mesogen and the photo-polymerizable group. Because the alkyl group is disposed between the mesogen and the photo-polymerizable group, a chain length may be selected to increase the degree of polymerization when the alignment aid receives light.

The alignment aid 50 is polymerized by light, and will be described with reference to FIG. 1 to FIG. 4.

Figure 3:
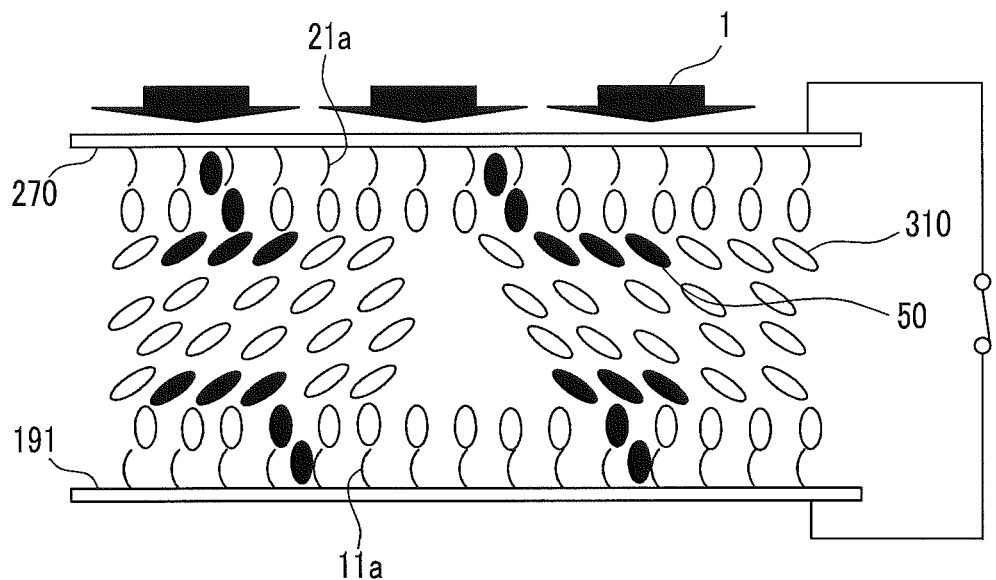
FIG. 3 and FIG. 4 are schematic diagrams showing an exemplary embodiment of a method of forming a pretilt of a liquid crystal by an alignment aid according to the invention.
Figure 4:
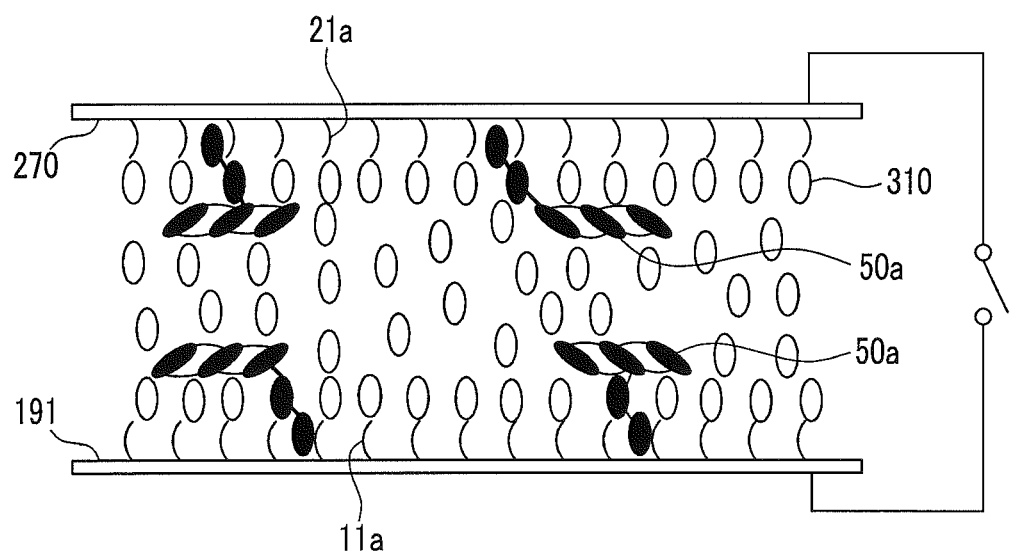

FIG. 3 and FIG. 4 are schematic diagrams showing an exemplary embodiment of a method for forming a pre-tilt of liquid crystal molecules through an alignment aid according to the invention.

Firstly, the lower panel 100 and the upper panel 200 are respectively manufactured.

The lower panel 100 is manufactured through the following method.

A plurality of thin films are deposited on an insulating substrate 110, and are patterned to sequentially form a plurality of gate conductors including a plurality of gate lines 121, a plurality of step-down gate lines 123, and a plurality of storage electrodes lines 125, a gate insulating layer 140, a semiconductor stripe, a data line 171, source electrodes 173h, 173l, and 173c, drain electrodes 175h, 175l, and 175c, and a lower passivation layer 180p.

Next, a color filter 230 is formed on the lower passivation layer 180p, and an upper passivation layer 180q including an organic material is formed on the lower passivation layer 180p and the color filter 230.

A conductive layer such as ITO or IZO is deposited and patterned on the upper passivation layer 180q to form a pixel electrode 191.

A light blocking member 220 is formed on the region that the color filter 230 does not occupy and on the region overlapping the portion of the color filter 230.

Next, an alignment layer (not shown) is coated on the pixel electrode 191.

The upper panel 200 is manufactured through the following method.

A common electrode 270 is formed on an insulation substrate 210. Next, an alignment layer (not shown) is coated on the common electrode 270.

Next, the lower panel 100 and the upper panel 200 that are manufactured through the above-described method are assembled, and a liquid crystal layer 3 is formed by injecting a mixture of liquid crystal molecules 310 and the above-described alignment aid 50 therebetween. However, the liquid crystal layer 3 may be formed by a method in which a mixture of the liquid crystal molecules 310 and the alignment aid 50 is dripped on the lower panel 100 or the upper panel 200.

Next, referring to FIG. 3, voltages are applied to the pixel electrode 191 and the common electrode 270. The liquid crystal molecules 310 and the alignment aid 50 are inclined in a direction parallel to the length direction of the minute branch electrodes of the pixel electrode 191 by the application of voltages. The liquid crystal molecules 310 near the alignment layer maintain vertical alignment by a chain 11a and 21a of the alignment layer.

First light 1 is irradiated in a state in which the voltages are applied between the pixel electrode 191 and common electrode 270. The first light 1 has a wavelength that can polymerize the alignment aid 50, such as ultraviolet rays. Here, the first light energy may be in the range of about 30 J/cm$^2$ to about 100 J/cm$^2$.

Accordingly, the alignment aid 50 that is agglomerated is polymerized to form a polymer 50a (see FIG. 4). The polymer 50a can control the pre-tilt of the liquid crystal molecules 310.

Next, as shown in FIG. 4, the voltages between the pixel electrode 191 and the common electrode 270 are turned off.

Next, light is irradiated to the liquid crystal layer 3 in a state in which the voltages between the pixel electrode 191 and the common electrode 270 are turned off, thereby increasing the polymerization ratio.

A liquid crystal display including the alignment polymer within the liquid crystal layer is formed by light-irradiating an alignment aid in the presence of liquid crystal molecules. The liquid crystal layer including the alignment polymer of a final liquid crystal display is considered a structural characteristic of the final liquid crystal display. Since the alignment polymer within the liquid crystal layer is formed by light-irradiating an alignment aid in the presence of liquid crystal molecules, such process of light-irradiating an alignment aid in the presence of liquid crystal molecules of the invention is considered to impart the distinct structural characteristic of the liquid crystal layer including the alignment polymer.

Next, an exemplary embodiment of a circuit structure and an operation of a liquid crystal display according to the invention will be described with reference to FIG. 1 and FIG. 2 and FIG. 5.

Figure 5:
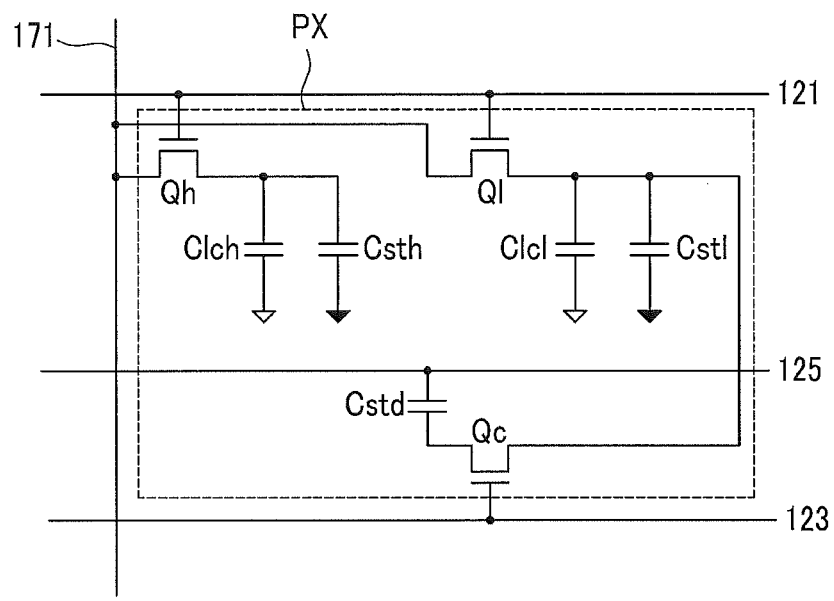
FIG. 5 is an equivalent circuit diagram of an exemplary embodiment of one pixel of a liquid crystal display according to the invention.

FIG. 5 is an exemplary embodiment of an equivalent circuit diagram of one pixel of a liquid crystal display according to the invention.

Referring to FIG. 5, a liquid crystal display shown in FIG. 1 and FIG. 2 includes signal lines including a gate line 121, a storage electrode line 125, a step-down gate line 123, and a data line 171, and a pixel PX connected to the signal lines.

The pixel PX includes the first, second, and third thin film transistors Qh, Ql, Qc, the first and second liquid crystal capacitors Clch and Clcl, the first and second storage capacitors Csth and Cstl, and a step-down capacitor Cstd.

The first and second thin film transistors Qh and Ql are respectively connected to the same single gate line 121 and the same single data line 171, and the third thin film transistor Qc is connected to the step-down gate line 123.

The first and second thin film transistors Qh and Ql as three-terminal elements provided in the lower panel 100 have a control terminal connected to the gate line 121, an input terminal connected to the data line 171, and an output terminal connected to the first and second liquid crystal capacitors Clch and Clcl and the first and second storage capacitors Csth and Cstl.

The third thin film transistor Qc as a three-terminal element provided in the lower panel 100 has a control terminal connected to the step-down gate line 123, an input terminal connected to the second liquid crystal capacitor Clcl, and an output terminal connected to the step-down capacitor Cstd.

The first and second liquid crystal capacitors Clch and Clcl are formed by respectively overlapping the first and second sub-pixel electrodes 191h and 191l connected to the first and second switching elements Qh and Ql, and the common electrode 270 of the upper panel 200, with each other. The first and second storage capacitors Csth and Cstl are formed by respectively overlapping the storage electrode line 125 as well as the storage electrode 129, with the first and second sub-pixel electrodes 191h and 191l.

The step-down capacitor Cstd is connected to the output terminal of the third thin film transistor Qc and the storage electrode line 125, and the storage electrode line 125 provided in the lower panel 100 and the output terminal of the third thin film transistor Qc overlap each other via an insulator.

Firstly, if the gate line 121 is applied with the gate-on voltage Von, the first and second thin film transistors Qh and Ql are turned on.

Accordingly, the data voltage applied to the data line 171 is simultaneously applied to the first and second sub-pixel electrodes 191h and 191l through the turned-on first and second switching elements Qh and Ql. The first and second liquid crystal capacitors Clch and Clcl are charged by a difference between the common voltage Vcom of the common electrode 270 and the voltage of the first and second sub-pixel electrodes 191h and 191l such that the charging voltage of the first liquid crystal capacitor Clch is the same as the charging voltage of the second liquid crystal capacitor Clcl. Here, the step-down gate line 123 is applied with the gate-off voltage Voff.

Next, the gate line 121 is applied with the gate-off voltage Voff, and simultaneously the step-down gate line 123 is applied with the gate-on voltage Von, the first and second switching elements Qh and Ql connected to the gate line 121 are turned off, and the third switching element Qc is turned on. Accordingly, the charges of the second sub-pixel electrode 191l connected to the output terminal of the second switching element Ql flow in the step-down capacitor Cstd such that the voltage of the second liquid crystal capacitor Clcl is decreased.

In a case that the exemplary embodiment of the liquid crystal display according to the invention is driven by frame inversion, when the data line 171 has the positive data voltage with respect to the common voltage Vcom in the current frame, the negative charges are gathered in the step-down capacitor Cstd after the previous frame is finished. In the current frame, if the third switching element Qc is turned on, the positive charge of the second sub-pixel electrode 191l flows in the step-down capacitor Cstd through the third switching element Qc such that the positive charges gather in the step-down capacitor Cstd and the voltage of the second liquid crystal capacitor Clcl is decreased. Next, in the next frame, the third switching element Qc is turned on in the state that the negative charges are charged in the second sub-pixel electrode 191l such that the negative charges of the second sub-pixel electrode 191l flow in the step-down capacitor Cstd such that the negative charges are gathered in the step-down capacitor Cstd, and the voltage of the second liquid crystal capacitor Clcl is also decreased.

As described above, in the exemplary embodiment, the charging voltage of the second liquid crystal capacitor Clcl is lower than the charging voltage of the first liquid crystal capacitor Clch regardless of the polarity of the data voltage. Accordingly, the charging voltages of the first and second liquid crystal capacitors Clch and Clcl are different such that the lateral view of the liquid crystal display may be improved.

Next, an exemplary embodiment of a method of manufacturing the above liquid crystal display will be described.

Referring to FIG. 1 and FIG. 2, a plurality of gate conductors including a plurality of gate lines 121, a plurality of step-down gate lines 123, and a plurality of storage electrode lines 125 extending in the transverse direction are formed on an insulation substrate 110. The gate line 121 to include the first gate electrode 124h and the second gate electrode 124l protruding up and down, the step-down gate line 123 to include the third gate electrode 124c protruding upward, and the first gate electrode 124h and the second gate electrode 124l to be connected to each other thereby forming one protrusion, are patterned.

The storage electrode line 125 to include a storage electrode 129 protruding upward and downward, a pair of longitudinal portions 128 extending almost perpendicularly to the gate line 121 downward, and a transverse portion 127 connecting the ends of a pair of longitudinal portions 128 to each other, and the transverse portion 127 to include a storage expansion 126 extended downward, are patterned.

A gate insulating layer 140 covering the gate conductor 121, 123, and 125 is formed and a plurality of semiconductor stripes including amorphous or crystalline silicon are formed on the gate insulating layer 140. The semiconductor stripes are mainly extended in the vertical direction and include the first and second semiconductors 154h and 154l extending toward the first and second gate electrodes 124h and 124l and disposed corresponding to the first and second gate electrodes 124h and 124l, and the third semiconductor 154c extending from the second semiconductor 154l and disposed corresponding to the third gate electrode 124c.

An ohmic contact stripe exposing a portion of the semiconductor stripe 151 is formed at a position corresponding to the gate electrodes 124h, 124l, and 124c on the semiconductor stripe. A data conductor including a plurality of data lines 171, a plurality of first drain electrodes 175h, a plurality of second drain electrodes 175l, and a plurality of third drain electrodes 175c is formed on the ohmic contacts.

A lower passivation layer 180p including an inorganic insulator such as silicon nitride or silicon oxide is formed on the data conductors 171, 175h, 175l, 175c and the exposed semiconductors 154h, 154l, and 154c. A color filter 230 and an upper passivation layer 180q including an organic material are formed on the lower passivation layer 180p.

A pixel electrode including a first sub-pixel electrode 191h and a second sub-pixel electrode 191l, and a shielding electrode 193 are formed on the upper passivation layer 180q.

A light blocking member 220 is formed on a region that the color filter 230 does not occupy and on a region overlapping a portion of the color filter 230. A column spacer CS protruded from the upper surface of the light blocking member 220 is formed, and the light blocking member 220 and the column spacer CS are formed with the same material and the same process, such that the light blocking member 220 and the column spacer are a single, unitary, indivisible member.

An exemplary embodiment of method of forming the light blocking member 220 and the column spacer CS according to the invention will be described.

Figure 6:
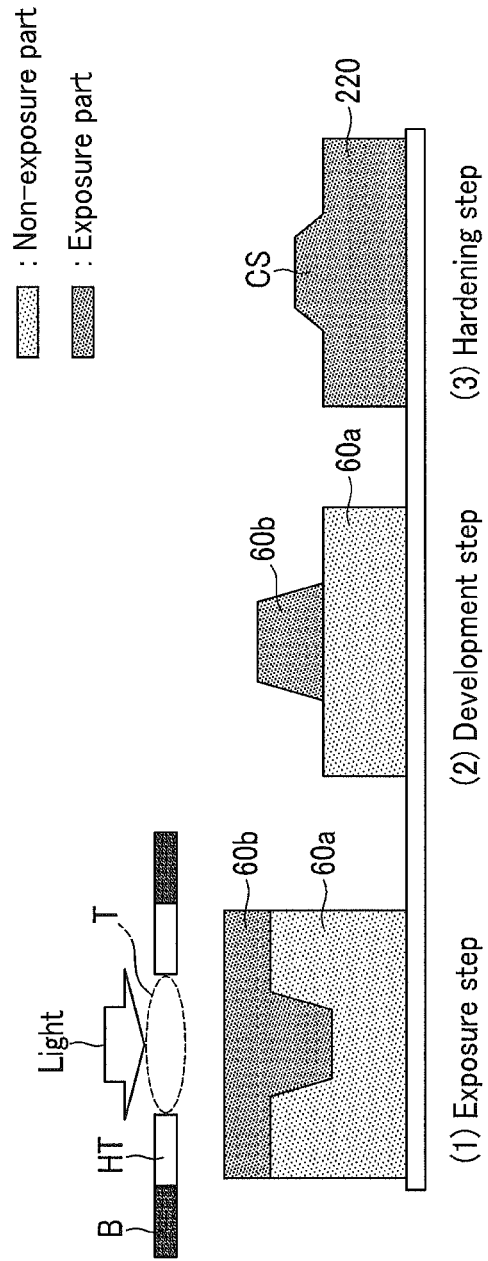
FIG. 6 is a cross-sectional view showing a method of forming a light blocking member by using a conventional half-tone mask.
Figure 7:
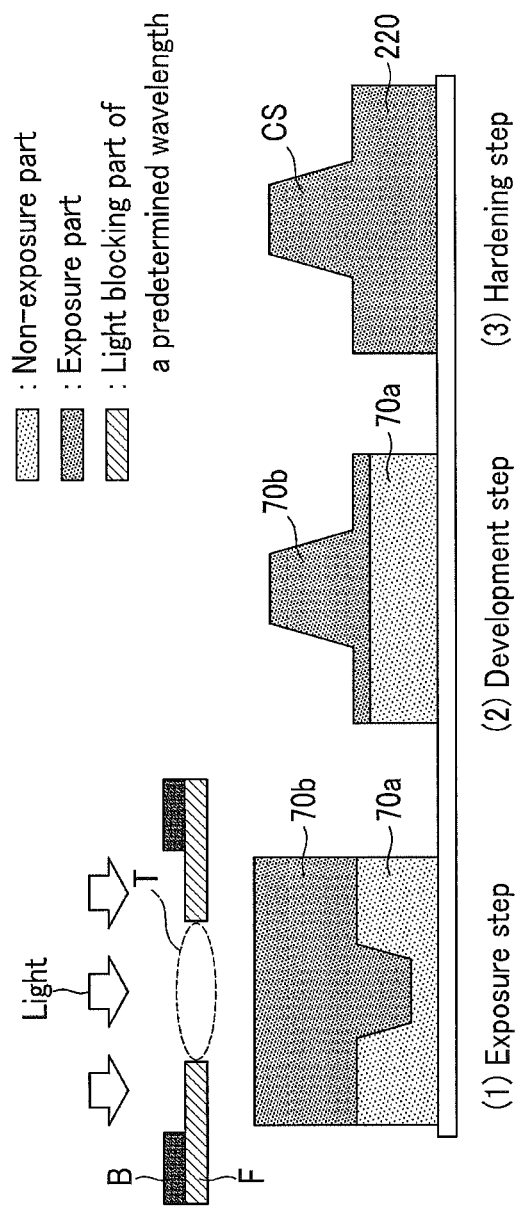
FIG. 7 is a cross-sectional view showing an exemplary embodiment of a method of forming a light blocking member by using a mask according to the invention.

FIG. 6 is a cross-sectional view showing a method of forming a light blocking member by using a conventional half-tone mask, and FIG. 7 is a cross-sectional view showing an exemplary embodiment of a method of forming a light blocking member by using a mask according to the invention.

Referring to FIG. 6, in (1), coated negative photoresist material is exposed by using a half-tone mask including a transmission part T, a semi-transmission part HT, and a light blocking part B. The photoresist material is divided into an upper layer 60b of a portion exposed by the light and a lower layer 60a that is not exposed by the light. In (2), a portion that is not irradiated by the light is removed by a development solution according to a characteristic of the negative photoresist material. In (3) (e.g., a post-hardening step), the reflow is generated such that a taper of the portion where the column spacer CS is formed is deteriorated, thereby boundaries of the light blocking member 220 and the column spacer CS are ambiguous. This is because the energy of the light passing through the semi-transmission part HT is decreased such that the exposure reaction is not progressed to the lower layer 60a, and as a result, the layer surface is non-uniform and the hardening degree is also decreased.

Referring to FIG. 7, an exemplary embodiment of the mask according to the invention includes the first region of the transmission part T, the second region corresponding to the light blocking filter layer F, and the third region of the light blocking part B. The light blocking filter layer F is a filter that passes light of a predetermined wavelength band among light of the several wavelength bands generated in a light exposer and blocks the light of the other wavelength bands.

In (1), after the negative photoresist is coated on the color filter 230, and the exemplary embodiment of the mask according to the invention is employed. The photoresist may include a binder, a monomer, an initiator, a coloring agent, and a solvent, and the initiator may be an initiator at least two kinds having different absorption wavelength bands. Also, the coloring agent includes the black-based material and may include at least one of the organic pigment and the inorganic pigment. In (1), the light passing through the second region where the light blocking filter layer F is disposed has the same energy as the light passing through the first region of the transmission part T and is irradiated to the negative photoresist. Accordingly, the exposure is further progressed for the photoresist overlapping the position corresponding to the second region compared with the case of using the semi-transmission part HT of the conventional half-tone mask in FIG. 6. In other words, a height in the exposure direction of the light of the interface between an upper layer 70b and a lower layer 70a is smaller than that of the interface between the upper layer 60b and the lower layer 60a illustrated in FIG. 6.

In the second region, among two initiators included in the photoresist, that is, at least two initiators having different absorption wavelength bands, only the initiator reacted with the light of the predetermined wavelength band passing the blocking filter layer F is reacted, and in the first region, the initiator having the absorption wavelength band other than the predetermined wavelength band is also photo-reacted as well as the light of the predetermined wavelength band passing the second region.

In (2), the remaining negative photoresist except for an exposed portion is removed. At this time, a pattern is formed to the surface of the photoresist corresponding to the second region and the hardening degree is also increased such that reflow generation may be suppressed. In (3), if ultraviolet rays are irradiated, the light blocking member 220 and the column spacer CS protruded therefrom may be formed as a single, unitary indivisible member, and the column spacer CS is protruded at a sufficient angle such that the boundary with the light blocking member 220 is clear.

A liquid crystal display including the column spacer which protrudes from an upper surface of the light blocking member as a single, unitary, indivisible member of the lower panel is formed by exposing a single photoresist layer using a single mask having the first to third regions described above. The light blocking member including the column spacer of a final liquid crystal display is considered a structural characteristic of the final liquid crystal display. Since the integral and continuous structure of the light blocking member and the column spacer is formed by exposing the single photoresist with the single mask of the invention, such process using the single photoresist with the single mask of the invention is considered to impart the distinct structural characteristic of the column spacer which protrudes from an upper surface of the light blocking member as a single, unitary, indivisible member.

Next, the alignment layer (not shown) is formed on the pixel electrode 191.

The method of manufacturing the lower panel 100 is described above, and for the upper panel 200, a common electrode 270 is formed on the insulation substrate 210 and the alignment layer (not shown) is coated thereon.

Next, the lower panel 100 and the upper panel 200 manufactured by the methods as described above are assembled, and then the mixture of the liquid crystal molecules 310 and the above-described alignment aid 50 is injected to form the liquid crystal layer 3. Next, the pretilt of the liquid crystal is formed by the alignment aid 50 as in the description of FIG. 3 and FIG. 4 such that the detailed description thereof is omitted here.

Figure 8:
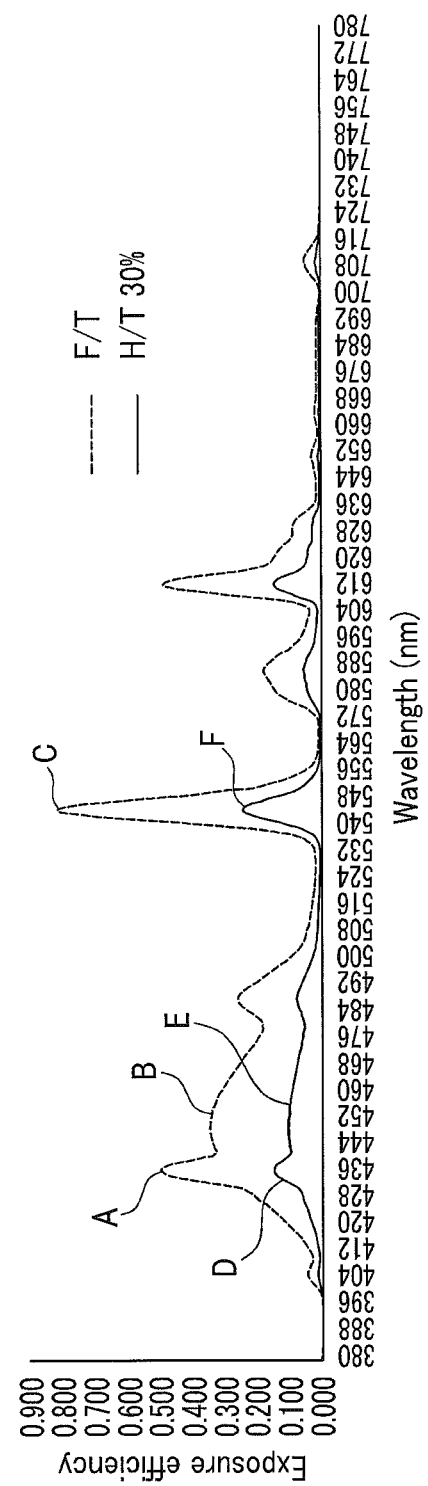
FIG. 8 is a graph showing exposure efficiency when using the conventional half-tone mask.
Figure 9:
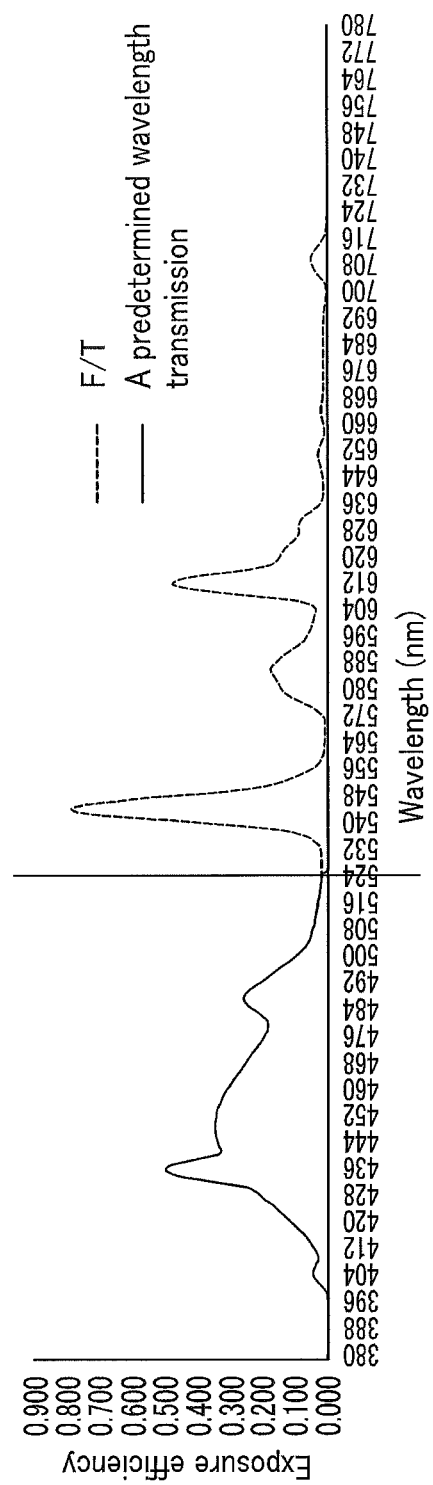
FIG. 9 is a graph showing exposure efficiency when using an exemplary embodiment of a mask according to the invention.

FIG. 8 is a graph showing exposure efficiency with respect to wavelength in nanometers (nm) when using a conventional half-tone mask and full-tone mask, and FIG. 9 is a graph showing an exposure efficiency with respect to wavelength in nm when using an exemplary embodiment of a mask according to the invention.

Referring to FIG. 8, exposure efficiency is decreased with predetermined ratio in a graph (H/T) when using a half-tone mask compared with a graph (F/T) when using a full tone mask. The exposure efficiency of each wavelength is substantially decreased when comparing the half-tone mask and the full-tone mask. The reason for this is that the energy reacting with the initiator is decreased by decreasing the energy emitted from the light exposer with the predetermined ratio in the case of the half-tone mask.

Referring to FIG. 9, when using an exemplary embodiment of the mask including the blocking filter layer capable of only passing the light of the predetermined wavelength region, the graph is almost similar to the graph when using the full-tone mask of FIG. 8. Accordingly, the energy of the predetermined wavelength band may be equally used like the case of using the full-tone mask. At this time, the predetermined wavelength band may be selectively used according to the kind of initiator.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of manufacturing a liquid crystal display, the method comprising:
    forming a thin film transistor on a first substrate;
    forming a color filter on the thin film transistor;
    forming a pixel electrode on the color filter; and
    forming a light blocking member including a column spacer which protrudes from an upper surface thereof, on the color filter,
    wherein the column spacer is formed in single body with the light blocking member, and
    wherein the forming the light blocking member uses a mask including a first region, a second region, and a third region, wherein
        the first region passes light generated from a light exposer,
        the second region includes a blocking filter layer which passes light of a predetermined wavelength band and which blocks light of wavelength bands other than that of the predetermined wavelength band, among wavelength bands of the light generated from the light exposer, and
        the third region blocks the light generated from the light exposer.

2. The method of claim 1, wherein
the forming the light blocking member including the column spacer includes:
    coating a photoresist on the color filter,
    exposing the photoresist by using the mask, and
    developing the photoresist to form the column spacer at a position corresponding to the first region and to form the light blocking member at a position corresnonding to the second region.

3. The method of claim 2, wherein in the exposing the photoresist, the light passing through the first region and the second region exposes the photoresist with the same energy.

4. The method of claim 3, wherein
the photoresist includes a binder, a monomer, an initiator, a coloring agent, and a solvent, and
the initiator includes initiators of at least two kinds having different absorption wavelength bands.

5. The method of claim 4, wherein
the coloring agent includes a black-based material.

6. The method of claim 5, wherein
the coloring agent includes at least one selected from the group consisting of an organic pigment and an inorganic pigment.

7. The method of claim 6, wherein
the initiator includes at least one initiator absorbing light of the predetermined wavelength band passing through the blocking filter layer.

8. The method of claim 1, further comprising
forming an organic layer between the thin film transistor and the pixel electrode.

9. The method of claim 1, further comprising:
forming a second substrate which faces the first substrate; and
forming a liquid crystal layer including a liquid crystal and an alignment polymer, between the first substrate and the second substrate,
wherein the alignment polymer is formed by light-irradiating the liquid crystal, and an alignment aid.

10. The method of claim 9, wherein
the pixel electrode includes a plurality of minute slits.

11. A method of manufacturing a liquid crystal display, the method comprising:
forming a thin film transistor on a first substrate;
forming a color filter on the thin film transistor;
forming a pixel electrode on the color filter; and
forming a light blocking member including a column spacer which protrudes from an upper surface thereof, on the color filter,
wherein the forming the light blocking member comprises:
coating a photoresist on the color filter, the photoresist including two initiators having different absorption wavelength bands,
exposing the coated photoresist using a mask including a first region, a second region, and a third region, wherein
the first region passes light generated from a light exposer,
the second region includes a blocking filter layer which selectively passes the light generated from the light exposer, and
the third region blocks the light generated from the light exposer, and
developing the photoresist to form the column spacer at a position corresponding to the first region and to form the light blocking member at a position corresponding to the second region.

* * * * *